UNITED STATES PATENT OFFICE.

CARL WEILAND, OF CHICAGO, ILLINOIS.

IMPROVEMENT IN ARTIFICIAL-STONE COMPOUNDS.

Specification forming part of Letters Patent No. 186,647, dated January 23, 1877; application filed December 30, 1876.

*To all whom it may concern:*

Be it known that I, CARL WEILAND, of Chicago, in the county of Cook and State of Illinois, have made a new and useful Improvement in Artificial-Stone Compounds; and I do hereby declare the following to be a full, clear, and exact description of the nature thereof, sufficient to enable others skilled in the art to which my invention appertains to fully understand, make, and use the same.

My invention consists of a composition of matter, forming artificial stone applicable for buildings, pavements, ornamentations, tombstones, &c., as follows:

Liquid glass or silicate of soda, or a solution thereof, two parts; coal-ashes, eight parts; sand, ten parts; broken bricks or other burnt material, ten parts; oyster-shells and plasterer's rubbish, ten parts; broken stone, one part; Portland or other cement, twenty parts; iron cinders or slag, twenty-five parts.

A quantity of water is placed in a box or mortar-mill, and to the same is added the liquid glass and cement, all well stirred together so that the cement will be thoroughly dissolved and intimately united with the liquid glass. The other ingredients are then added and mixed, so that the mass will be of the consistency of common mortar.

The concrete thus produced may now be molded into blocks or shapes, or laid in the mass, according to requirements, and it will dry quickly, the result being a composition that is hard, dense, and well held together, and one that will stand fire, water, moisture, and frost, its surface being fine and smooth. As most of the materials are waste or refuse matters the product will be cheap.

Coloring substances may be added to the mass when in a plastic state, and the liquid glass will fasten or fix the color.

In the formation of buildings the nature of the composition is such that I am enabled to form the walls thereof of successive layers of the mass, so that said walls present the appearance of a solid piece. In this operation I employ molds or patterns, and fill or partly fill the same, and allow the mass to set, after which another layer is placed therein, and the operation is repeated throughout, the mold or patterns being properly oiled to prevent rust thereof, and sticking of the mass thereto.

Having thus described my invention, what I claim as new, and desire to secure by Letters Patent, is—

The composition of matter consisting of silicate of soda, coal-ashes, sand, broken bricks oyster-shells, plasterer's rubbish, broken stone, cement, and slag, all as set forth.

CARL WEILAND.

Witnesses:
JOHN A. WEIDERSHEIM,
JNO. A. BELL.